United States Patent [19]

Ban et al.

[11] 4,031,557
[45] June 21, 1977

[54] CASETTE LOADING DEVICE FOR USE IN MAGNETIC SOUND RECORDING AND PLAYING BACK APPARATUS

[76] Inventors: Itsuki Ban, 829, Higashi, Ohizumi, Nerima, Tokyo; Kazunori Mochizuki, 6673, Ohaza Hodaka, Hodakamachi, Minamiazumi, Nagano, both of Japan

[22] Filed: Aug. 4, 1975

[21] Appl. No.: 601,437

[30] Foreign Application Priority Data

Aug. 2, 1974  Japan .............................. 49-87996
Aug. 2, 1974  Japan .............................. 49-87995

[52] U.S. Cl. .............................................. 360/96
[51] Int. Cl.² ..................... G11B 15/00; G11B 5/54
[58] Field of Search .................... 360/96, 93, 130

[56] References Cited

UNITED STATES PATENTS

| | | | |
|---|---|---|---|
| 3,849,799 | 11/1974 | Nakamichi | 360/96 |
| 3,855,627 | 12/1974 | Vettore et al. | 360/96 |
| 3,867,722 | 2/1975 | Syohji | 360/96 |
| 3,877,075 | 4/1975 | Watanabe | 360/96 |
| 3,902,681 | 9/1975 | Boehme | 360/96 |
| 3,947,884 | 3/1976 | Yokota et al. | 360/96 |
| 3,950,787 | 4/1976 | Hosaka | 360/96 |

*Primary Examiner*—Vincent P. Canney
*Attorney, Agent, or Firm*—Fleit & Jacobson

[57] ABSTRACT

In a cassette loading device for use in magnetic sound recording and playing back apparatus of the class wherein a cassette is inserted into a cassette holder contained in the holder of the apparatus from the front panel there are provided a downwardly inclined chassis mounted on the inner side of the front panel, a capstan and reel supporting platforms mounted on the chassis, a cassette holder mounted on the chassis to be rotatable about an axis perpendicular to the direction of insertion of the cassette into the cassette holder, spring means for biasing the cassette holder to rotate downwardly, a cassette detection lever mounted near the inner end of the cassette holder so as to be rotated by the inserted cassette, and a stop member mounted on the chassis such that the upper surface thereof cooperates with the cassette detection lever before the cassette is inserted completely thereby maintaining the cassette holder in the horizontal position against the biasing force of the spring means.

6 Claims, 15 Drawing Figures

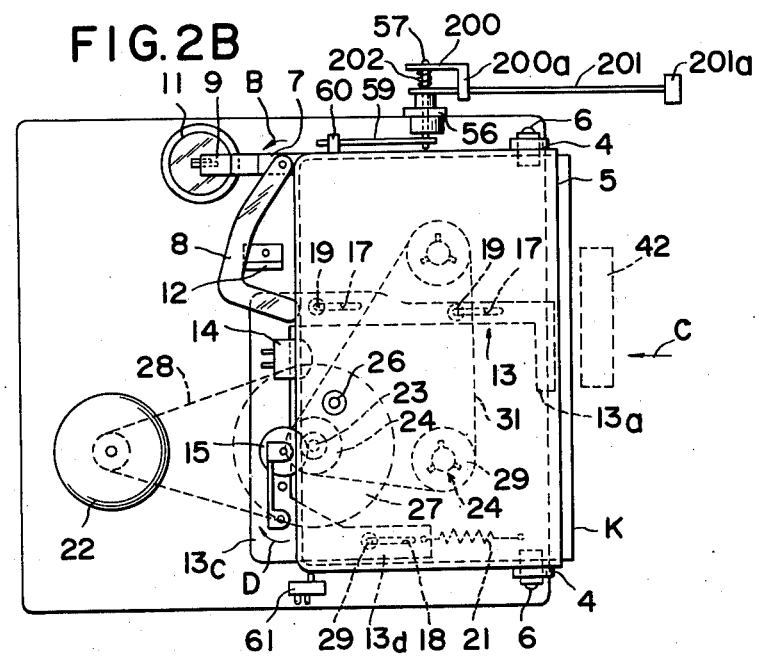
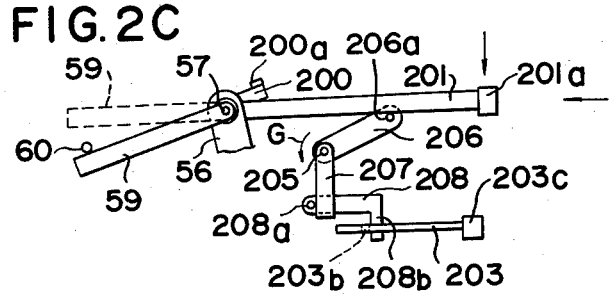
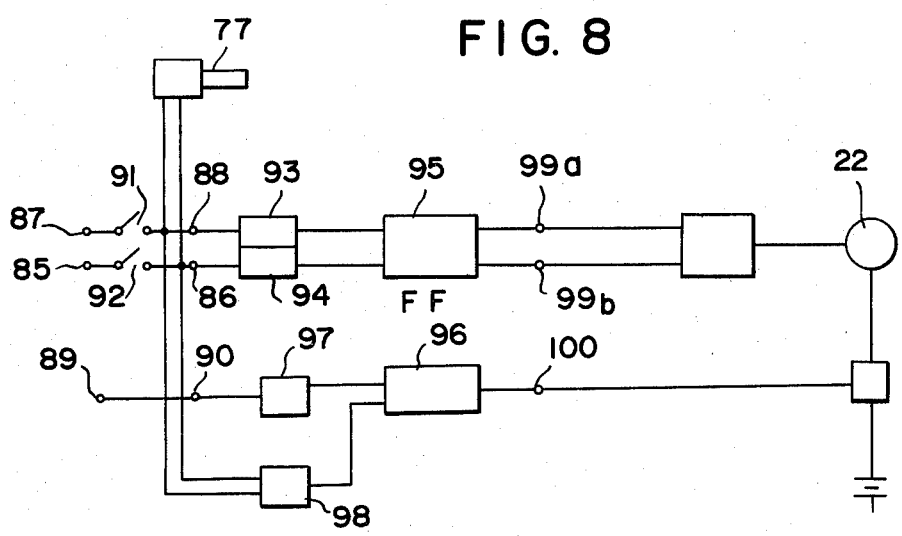

CASETTE LOADING DEVICE FOR USE IN MAGNETIC SOUND RECORDING AND PLAYING BACK APPARATUS

BACKGROUND OF THE INVENTION

This invention relates to magnetic sound recording and playing back apparatus, and more particularly to improvements of the cassette loading mechanism.

Magnetic sound recording and playing back apparatus or decks utilizing magnetic tapes contained in a cassette are generally constructed as upper surface operating type, that is mode changing for switching the operation among playing back, recording, rewinding, quick feed, etc., loading and unloading of the cassette, and other operations are all performed on the upper panel of the holder of the apparatus.

It is a recent trend to mount such apparatus or decks on a rack together with various stereo components such as a stereo tuner, integral amplifier, etc., and to incorporate said apparatus or decks into the center box of a household stereo set. Such tendency has resulted in the development of the so-called front panel type sound recording and playing back apparatus in which an operating panel is provided on the front side of the holder and all control elements for mode changing, loading and unloading of the cassette, and other operations are mounted on the front operating panel.

Although various types of the front panel type cassette sound recording and playing back apparatus or decks have already been proposed they have the following common problems. More particularly, according to the prior art cassette loading mechanism the cassette is inserted into the holder in the horizontal direction through a cassette insertion opening provided through the front panel and then the cassette falls down in the vertical direction to reach the sound recording or playing back position. In this manner, as the cassette is moved in both horizontal and vertical directions the construction of the cassette loading mechanism is complicated and expensive. In addition, such complicated construction accompanies frequent faults. Such troubles are caused by the fact that manual cassette loading operation is automated.

SUMMARY OF THE INVENTION

It is an object of this invention to provide an improved cassette loading mechanism having a simple construction yet can operate accurately wherein the cassette can be automatically brought to the sound recording and playing back position after it has been manually inserted into the holder in the horizontal direction through a cassette insertion opening provided for the front panel of the cassette tape sound recording and playing back apparatus.

Another object of this invention is to provide a novel cassette loading device incorporated with a novel mode switching mechanism.

Still another object of this invention is to provide an improved cassette loading device according to which the cassette can be inserted into the cassette holder in the horizontal direction without being inteferred by the magnetic head, pinch roller and capstan utilized to run the magnetic tape.

According to this invention these and further objects can be accomplished by providing a cassette loading device for use in magnetic sound recording and playing back apparatus of the class wherein a cassette is inserted into a cassette holder contained in the holder of the apparatus through cassette insertion openings provided for the front panel of the holder of the apparatus and the one side wall of the cassette holder, characterized in that a downwardly inclined chassis is mounted on the inner side of the front panel, that a capstan for driving a magnetic tape contained in the cassette and reel supporting platforms are mounted on the chassis, that the cassette holder is mounted on the chassis to be rotatable about an axis perpencidular to the direction of insertion of the cassette into the cassette holder through the cassette holder which is biased to rotate downwardly by means of spring means, that a cassette detection lever is mounted near the inner end of the cassette holder so as to be rotated a predetermined angle by the cassette when it is inserted completely, and that a stop member is mounted on the chassis such that the upper surface thereof cooperates with the cassette detection lever before completion of the insertion of the cassette thereby maintaining the cassette holder in the horizontal position against the biasing force of the spring means.

The cassette insertion openings have a width such that the cassette can be inserted into the cassette holder in a direction parallel to the shorter or longer side of the cassette. There are also provided on operating lever mounted on the bottom plate of the cassette holder to be slidable in the direction of insertion of the cassette, the operating member including a portion extending in parallel with the inner edge of the cassette holder, a magnetic head and a pinch roller mounted on said portion of the operating lever, and spring means for biasing said operating lever to pull said portion thereof toward the cassette holder. The operating lever includes an operating member depending downwardly along the inner surface of the front panel. There is also provided a mode switching mechanism including a plurality of push buttons mounted on the front panel for cooperating with the operating member thereby moving said portion of the operating member to move toward and away from the inner edge of the cassette holder and driving the operating motor of the sound recording and playing back apparatus in the forward and reverse directions.

BRIEF DESCRIPTION OF THE DRAWINGS

Further objects and advantages of the invention can be more fully understood from the following detailed description of some preferred embodiments of the invention taken in conjunction with the accompanying drawings in which:

FIG. 2B is a plan view showing a modified cassette loading mechanism;

FIG. 2C is a side view showing certain essential component elements of the modified cassette loading mechanism shown in FIG. 2B;

FIG. 8 is a block diagram of the motor control circuit utilized in the second embodiment shown in FIGS. 7A and 7B.

DESCRIPTION OF THE PREFERRED EMBODIMENTS

Figure 1:
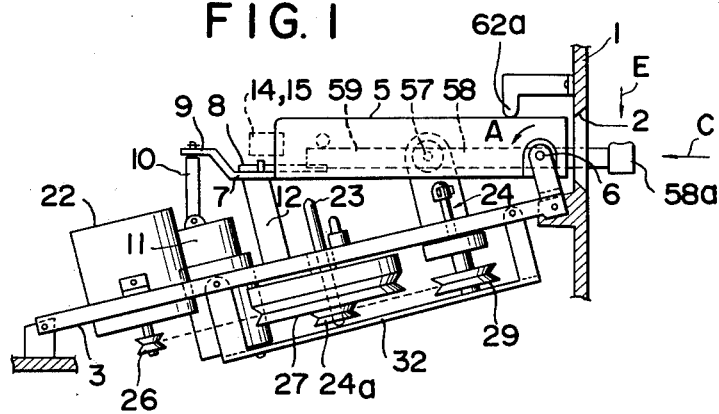
FIG. 1 is a side view showing one example of the cassette loading mechanism embodying the invention.
Figure 2A:
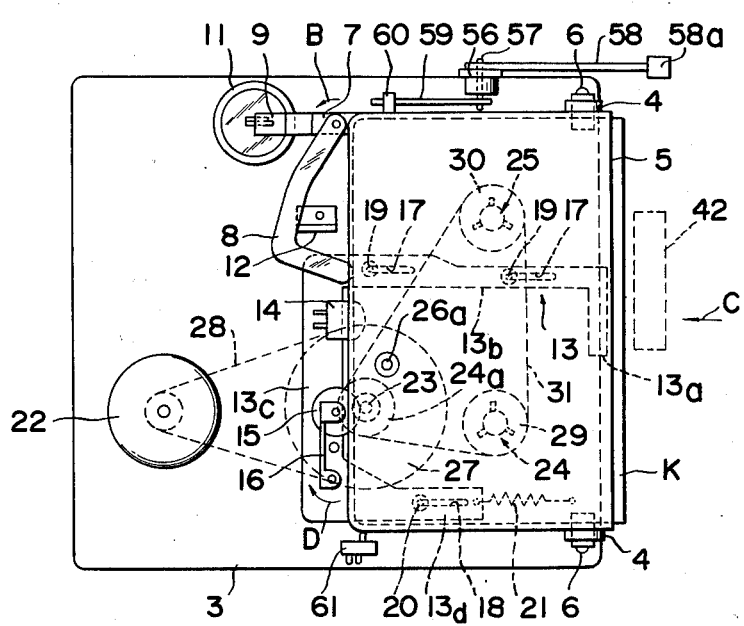
FIG. 2A is a plan view of the cassette loading mechanism shown in FIG. 1.

With reference now to the accompanying drawings, FIGS. 1 and 2A illustrate the novel cassette loading mechanism of this invention suitable to be incorporated into the center box of a household stereo set. The cassette loading mechanism illustrated therein comprises a chassis 3 mounted on the inside of the front panel 1 of the center box to incline downwardly from a point near the lower edge of a cassette insertion opening 2 provided through the front panel 1. On the opposite sides of one end of the chassis 3 near the front panel 1 are secured brackets 4 for supporting pins 6 on both side plates at the opened end of a cassette holder 5 which is formed as a thin box having an opening, not shown, confronting the cassette insertion opening 2. A bracket 7 is connected to the bottom plate of the cassette holder to extend in parallel with the bottom plate for pivotally supporting one end of an L shaped cassette detection lever 8. Further, the bracket 7 is provided with an integral supporting member 9 occupying a position above bracket 7. The free end of the supporting member 7 is connected to an air cylinder 11 through a connecting rod 10. A stop member 12 is mounted on the chassis 3 at such position that a portion of the upper end of the stop member 12 lightly engages one side edge of the cassette detection lever 8 on the side thereof facing the cassette holder 5.

The cassette holder 5 is normally subjected to a biasing force by means of a spring, not shown, for rotating the holder in the counterclockwise direction as shown by an arrow A. Also the cassette detection lever 8 is applied with a biasing force tending to insert the free end of the lever 8 into a window, not shown, of the cassette holder 5 as shown by an arrow B.

An L shaped operating lever 13, shown in FIG. 2A alone, is mounted on the outside of the bottom plate of the cassette holder 5 to be slidable in the direction of insertion of the cassette, as shown by an arrow C. The operating lever 13 is mounted on the bottom plate of the cassette holder with its one end positioned close to the cassette insertion opening. As shown in FIGS. 2A and 3B the operating lever 13 comprises a curved operating member 13a operated by the mode switching mechanism which will be described later with reference to FIGS. 3A and 3B, a connecting member 13c connected to the operating member 13a through a long leg 13b and extending in parallel with the inner end of the cassette holder 5 and a short leg 13d connected to one end of the connecting member 13c and extending toward the cassette insertion opening 2. The connecting member 13c carries a magnetic head 14 and a pivoted lever 16 which supports a pinch roller 15. The long leg 13b is provided with two elongated slots 17 whereas the short leg 13d is provided with a single elongated slot 18. Guide pins 19 and 20 secured to the outer surface of the bottom plate of the cassette holder are slidably received in elongated slots 17 and 18, respectively, and a spring 21 is connected between the free end of the short leg 13d and the bottom plate of the cassette holder 5 for biasing the operating lever 13 toward the cassette insertion opening 2. It is to be understood that the lever 16 carrying pinch roller 15 is subjected to a biasing force exerted by a spring, not shown, for inserting the pinch roller 15 into the window, not shown, of the cassette holder, as shown by an arrow D.

An electric motor 22, a capstan 23 driven thereby, through a pulley 24a, reel supporting platforms 24 and 25 and a cassette positioning pin 26a are mounted on the chassis 3 at respective predetermined positions to be described hereinafter. As shown in FIGS. 1 and 2A, the driving motor 22 and capstan 23 are coupled together through pulleys 26 and 27 and a belt 28 whereas the reel supporting platforms 24 and 25 are driven by the capstan 23 through pulleys 24a, 29 and 30 and and endless belt 31.

Figure 4A:
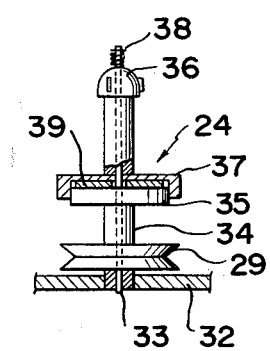
FIG. 4A is a front view, partly in section, of a reel supporting platform.
Figure 4B:
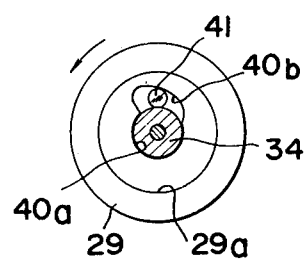
FIG. 4B is a cross-sectional view of the reel supporting platform shown in FIG. 4A.

Since both reel supporting platforms 24 and 25 have the same construction the construction of the former will be described with reference to FIGS. 4A and 4B. Thus, a shaft 33 is secured to the subchassis 32 of chassis 3 for rotatably supporting a sleeve 34 integral with a friction disc 35. The sleeve 34 is connected to pulley 29 in a manner to be described later in connection with FIG. 4B. A reel shaft 36 is mounted on the chassis 3 to project above the upper surface thereof, and the lower end of the reel shaft 36 is provided with an integral friction cup 37 having a recess adapted to engage disc 35. The reel shaft 36 is also rotatably mounted on the shaft 33. A spring 38 is provided for imparting a downward biasing force to the reel shaft 36 and a friction member 39 made of felt, for example, is interposed between the disc 35 and the friction cup 37. As shown in FIG. 4B, the pulley 29 is provided with a circular recess 29a on the upper surface thereof in a concentric relation with the pulley 29. A plate cam 40 having a central opening 40a having the same diameter as the outer diameter of the sleeve 34 and a notch 40b, the radial dimension thereof increasing in the direction of rotation of the pulley 29, is fitted in the circular recess 29a. A steel ball 41 is received in the notch 40b of the plate cam 40b. Thus, the pulley 29 and sleeve 34 is coupled together through a one way clutch. However, it is to be understood that the one way clutch intercoupling pulley 30 and reel supporting platform 25 has an operating direction opposite to that of the one way clutch between pulley 29 and the reel supporting platform 24.

Figure 3A:
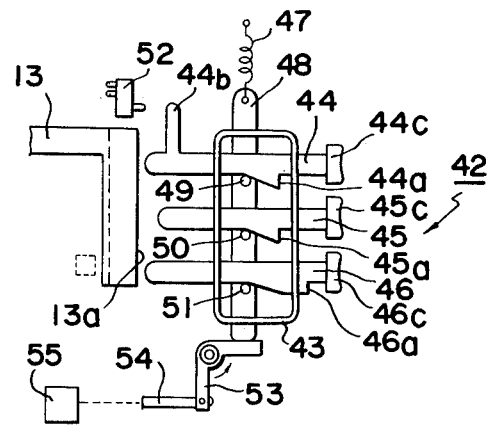
FIG. 3A is a plan view of the mode switching mechanism.
Figure 3B:
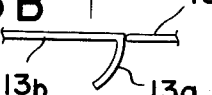
FIG. 3B is a side view of a portion of the operating lever utilized in the mode switching mechanism shown in FIG. 3A.

As shown in FIG. 3B the depending operating member 13a of the operating lever 13 confronts to the inner ends of respective selection push buttons of the mode switching mechanism 42 which is shown as a block in FIG. 2A but in detail in FIG. 3A. The mode switching mechanism 42 comprises a rectangular supporting frame 43, rewinding push button 44, a rapid feeding push button 45, and playing back push button 46 which are slidably supported by the frame 43 and respectively provided with shoulders 44a, 45a and 46a each having a sharp vertical edge and an inclined surface on the side of the operating member 13a. A locking bar 48 biased by a spring 47 extends in a direction perpendicular to the direction of sliding of the push buttons and pins 49, 50, and 51 secured to the locking bar 48 and urged against respective inclined surfaces of the shoulders. In this manner, the push buttons and the locking bar constitute a selective push button mechanism so that either one of the push buttons can be locked in the operated position by the corporation of the pin and the shoulder. The shoulder 46a of the push button 46 is located closer to the outer end of the push button than the shoulders of the other push buttons. As shown in FIG. 3A, a projection 44b is provided near the inner end of push button 44 for operating a motor reversing switch 52 mounted on the cassette casing 5. One arm of a spring biased bellcrank arm 53 is disposed to abut against the lower end of the locking bar 48, and the other arm of the bellcrank arm 53 is connected to a brake device 55 shown as a block in FIG. 3A. The construction and operation of the brake device will be described later. Respective push buttons are provided with operating members 44c, 45c and 46c on their outer ends.

Referring again to FIGS. 1 and 2A, a bracket 56 is provided on one side of the chassis 3 for journalling a shaft 57 extending in a direction perpendicular to the direction of insertion of the cassette. Parallel levers 58 and 59 are secured to the opposite ends of the shaft 57, the lever 58 being provided with a knob 58a on its outer end. The upper surface of the inner end of lever 59 is located just beneath a projection 60 secured to one side of the cassette holder 5. A source switch 61 is provided near the other side of the cassette holder 5 with its operating member projected in a pass of travel to be described later. Further a stopper 62a for stopping the movement of the cassette holder is mounted on the inner surface of the front panel 1.

The cassette type sound recording and playing back apparatus provided with the cassette loading mechanism described above operates as follows. Where a cassette 59 is not contained in the cassette holder 5, the free end of the cassette detection lever 8 is urged to protrude into the cassette casing through the opening thereof until the lever 8 engages the upper end of the stop member 12 so that the cassette holder 5 will be held in the horizontal position in spite of the spring biasing force applied thereto.

At first the rewind push button 44c is depressed to be locked in the forward or depressed position. Then a cassette 59 is inserted into the cassette holder 5 as shown by an arrow C in FIG. 1 until its end engages the inner side wall of the cassette holder 5. Then the free end of the lever 8 which has been pushed into the cassette holder 5 through the window will be pushed out by the inserted cassette so that the lever 8 is rotated in the clockwise direction against the spring biasing force. Then the lever 8 disengages from the upper end of the stop member 12 thereby releasing the cassette holder 5 from the restraining force. Consequently, the cassette holder 5 rotates in the counterclockwise direction as shown by arrow A under the spring biasing force. During this downward movement the depending operating member 13a of the operating lever 13 disposed beneath the cassette holder 5 will come to engage the inner end of the push button 44 which has been locked in the forward position as above described whereby the operating lever 13 is moved to the left as viewed in FIG. 3A against the biasing force of spring 21 thus separating the magnetic head 14 and the pinch roller 15 away from the cassette holder 5. Consequently, when the cassette holder 5 completes its downward movement so that its bottom plate engages the chassis 3. Under these conditions, the magnetic tape, not shown, contained in the cassette will not be interferred by the magnetic head 14 and the capstan 23 and these elements will not be prevented by the pinch roller 15 from entering into an opening of the cassette. The cassette is maintained in a predetermined position when pin 26a is received in an opening, not shown, provided for the cassette. Further, in this position, reel shafts of two reel supporting platforms 24 and 25 are received in openings, not shown, provided for the cassette.

As has been pointed out hereinabove, since the source switch 61 is secured to the chassis 3 with its operating member projected in the path of movement of cassette holder 5, as the cassette holder 5 completes its downward movement the sound recording and playing back apparatus is connected to the source of supply, not shown. Furthermore, as the motor reversing switch 52 has been closed by the push button switch 44, the driving motor 22 begins its reverse rotation consequently with the completion of the downward movement of the cassette holder 5.

However, as the magnetic tape is mounted on the reel supporting platform 24 which is now operated as the take up shaft by the reverse operation of the motor 22, it is impossible to further take up the tape. Consequently, a slip occurs between disc 34 and the friction cup 37 of the reel supporting platform 24 whereas the reel supporting platform 25 acts as a pay out reel but rotates in vain. In other words, the magnetic tape contained in the cassette in the cassette holder 5 is maintained standstill with its initial end held at the normal position.

It is now assumed that the push button 46 is depressed. Then the push button 44 is unlocked to reset thus opening the motor reversing switch 52. As a result, the motor 22 rotates in the forward direction. As the shoulder 46a of the push button 46 is located close to the operating member 46c so that this shoulder will not be locked by pin 51, and the push button 46 will return to the original position as soon as the operating force applied to the operating member 46c is removed. After confirming the resetting of the push button 44, the force applied to the operating member 46c is removed thus resetting the push button 46. As a consequence, the operating lever 13 is pulled by spring 21 to approach the opening at the inner end of the cassette holder 5, whereby the magnetic heat 14 is brought close to the magnetic tape contained in the cassette whereas pinch roller 15 is brought to clamp the magnetic tape between it and the capstan 23, thus commencing the playing back of the magnetic tape.

To temporally stop or pause the playing back operation, push button 46 is depressed and held in the forward position thus holding the operating lever 13 in the forward position. This moves the pinch roller 15 and the magnetic head away from the capstan 23 and the magnetic tape respectively, and the brake device 55 is operated through lever 54 by the downward movement of the locking bar 48 against the force of spring 47 which is caused by the depression of the push button 46 and by the clockwise rotation of the bellcrank lever 53. Although the detail of the construction of the brake device is not shown it applies a pressure or braking force to the peripheries of the friction cups of both reel supporting platforms 24 and 25. As described above since the capstan 23 and pinch roller 15 are separated and the braking force is applied to both reel supporting platforms, the magnetic tape will be maintained at standstill. When the push button 46 is released, the apparatus resumes the playing back condition.

Where it is desired to rapidly feed the magnetic tape, push button 45 is depressed and locked in the forward position. Then, the operating lever 13 too is held in the forward position thus separating the magnetic head 14 and the pinch roller 15 away from the magnetic tape and the capstan 23, respectively. Thus, the magnetic tape is freed and the reel supporting platform 25 acts as the take up reel whereas the reel supporting platform 24 acts as the pay off reel with the result that the magnetic tape is taken up at a high speed by the reel supporting platform 25, thereby providing a high speed feeding. In the case of switching the operation to the high speed feeding the brake device 55 is operated in the same manner as the pause. The operation of the brake device 55 is terminated when the pin 50 of the locking lever 48 rides over shoulder 45a of push button 45. Thus, during the mode switching operation between playing back and rapid feeding operations a braking force is applied to both reel supporting platforms thus preventing under tensioning or slackening of the magnetic tape.

The cassette can be removed from above said device in the following manner. Thus, immediately after separating the magnetic head 14 and capstan 15 away from the magnetic tape and the capstan 23 by depressing rewinding push button 44 or rapid feeding push button 45, knob 58a is depressed in a direction as indicated by an arrow E in FIG. 1 so as to rotate levers 58 and 59 about shaft 57 in the same direction as the knob. Consequently, the cassette holder 5 is rotated upwardly through pin 60 against the force of the biasing spring. Concurrently with the commencement of the upward movement the source switch 61 is opened to stop the motor 22. For this reason, the rapid feeding or rewinding of the magnetic tape is effected only a little during this period. Under a condition where the magnetic tape has been completely taken up by the reel supported by the reel supporting platform 25, when the cassette holder is rotated upwardly under the rapid feeding condition, respective reel supporting platforms rotate freely so that the tape is held standstill. As the cassette holder assumes the horizontal position, the cassette detection lever 8 disengages from the side surface of the stop member 12 and rides on the top surface thereof. Then, the cassette holder 5 will be positioned horizontally by the engagement of the lever 8 against the upper surface of the stop member 12. Furthermore, since the free end of the cassette detection lever 8 is forced into the cassette holder 5 by the force of the spring the cassette is pushed out of the cassette holder 5.

To play back the magnetic tape under these conditions, the operation of the apparatus is switched to the rewinding condition by depressing the rewinding push button 44 and then a cassette is inserted into the cassette holder 5. Generally, the playing back is commenced under a condition in which the tape has been completely taken up on either one of the reels of the cassette. Under these conditions, if the cassette holder 5 is rotated downwardly to rest on the chassis 3 there is no trouble because the tape is held standstill as has been pointed out hereinabove.

Since the magnetic tape is fed rapidly for only a short interval between resting of the cassette holder on the chassis and the depression of the playing back push button 46, there is no practical trouble. For this reason, the cassette holder 5 may be lowered from the elevated position while the apparatus is being set to the rapid feeding condition. Even in such a case, during the downward movement, since the operating lever 13 is held in the forward position by the depressed push button 45 the magnetic head 14 and the pinch roller 15 are maintained at positions not to interfere with the magnetic tape contained in the cassette and the capstan 23, respectively.

Figure 3C:
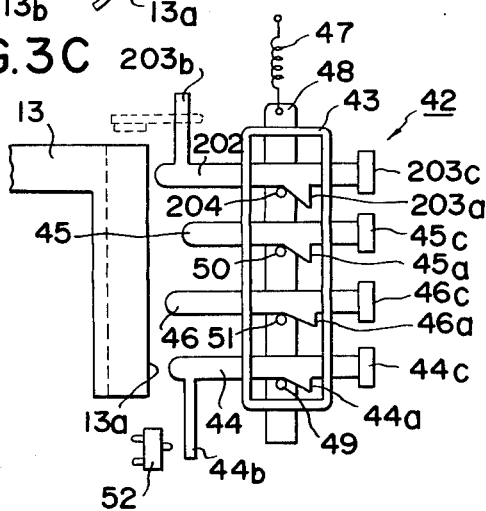
FIG. 3C is a plan view of a mode switching mechanism utilized in the modified cassette loading mechanism shown in FIG. 2B.

FIGS. 2B, 2C and 3C show a modified embodiment of this invention in which corresponding elements are designated by the same reference characters as in FIGS. 2A, 3A and 3B. In this modified embodiment, as shown in FIG. 2B, one end of a lever 59 is secured to the end of a shaft 57 close to the cassette holder 5, the shaft 57 being rotatably supported by a bracket 56. To the opposite end of the shaft 57 is secured one leg of an L shaped stop member 200 having the other leg 200a extended in parallel with the shaft 57. The stop member 200 is mounted such that the lower end of the leg 200a is positioned above a plane including the upper edge of the lever 59 and perpendicular to the shaft 57. One end of a lever 201 is loosely connected to the shaft 57 between bracket 56 and the stop member 200 and a helical spring 202 is interposed between the lever 201 and the stop member 200 so as to urge the lower end of the leg 200a of the stop member 200 against the lever 201 thereby maintaining the levers 201 and 59 is axial alignment when viewed from one side. An operating knob 201a is mounted on the outer end of lever 201.

As shown in FIG. 36, the mode switching mechanism 42 includes a stop push button 203 at the position of the play back push button 44 shown in FIG. 3A whereas in this modification the rewinding push button 44 is mounted on the lower side of the mode switching mechanism. All push buttons 203, 45, 46 and 44 shown in FIG. 3C are provided with locking shoulders 203a, 45a, 46a and 44a cooperating with the pins 204, 50, 51 and 49 respectively of a locking bar 48. The push button 203 is provided with a lateral projection 203b.

The following mechanism is interposed between the lower surface of the lever 201 and the lateral projection 203b of the push button 203. More particularly, as shown in FIG. 2C, there are provided a shaft 205 which is rotatably supported by the chassis, not shown in FIG. 2C, and located between the lever 201 and the stop push button 203 and a pair of levers 206 and 207 secured to the shaft 205 at an obtuse angle. A pin 206a is secured to the outer end of the lever 206 adjacent the lever 201.

An L shaped slidable member 208 is slidably supported by the chassis, not shown, to be slidable in parallel with the stop push button 203. A pin 208a a secured to one end of the slidable member 208 is disposed to engage one side of the lever 207 whereas the vertical leg of the slidable member 208 is disposed to engage the righthand side (as viewed in FIG. 3C) of the lateral projection of the stop push button 203. It is to be understood that the shaft 205 is biased to rotate in the counterclockwise direction as shown by an arrow G in FIG. 2C by a spring, not shown, so as to urge the pin 206a at the outer end of the lever 206 against the lower surface of the lever 201.

Since in this embodiment, lockable stop push button 203 has been added when the stop push button 203 is depressed and locked and when the lever 201 is depressed downwardly cassette up can be effected. More particularly, under these conditions, both the pinch roller and the magnetic tape are separated from the cassette so that it is possible to move upwardly the cassette holder with a minimum resistance. Accordingly, the cassette up can be effected within the biasing force of the spring 202 utilized to urge the lever 201 against the leg 200a of the stop member 200 and the levers 201 and 59 are rotated while they are maintained in axial alignment thus completing the cassette up operation.

Where the stop push button 203 is not locked so that the pinch roller and the magnetic head are inserted in the cassette, depression of the lever 201 results in the following operation. More particularly, as the resistance to the cassette up operation is larger than the biasing force provided by spring 202, the lever 201 will descend while it is out of alignment with lever 59. As a result, lever 206 and shaft 205 are rotated in the clockwise direction through pin 206a against the force of the spring so that the lever 207 pulls the slidable member in the direction of insertion of the cassette. The vertical leg 208a of the slidable member 208 engages the lateral projection 203b of the stop push button 203 to pull it in the same direction, thus causing pin 204 to engage shoulder 203a for locking the stop push button 203. Thus, the operating lever 13 is positioned at a definite position at which the cassette loading mechanism stops its operation and the pinch roller and the magnetic head are moved away from the cassette. At this time the resistance is decreased so that the lever 59 is rotated to the position shown by dotted lines in FIG. 2C by spring 202 thus completing the cassette up operation.

As described above, according to this modified embodiment, even when the cassette up is effected at any stage of the mode switching since the cassette up is effected only after the mechanism has been stopped, there is no trouble in operating the mechanism.

Although in the foregoing description, the description regarding the recording push button has been omitted since it has no relation to this invention and for the purpose of simplifying the description, it should be understood that such recording push button is also provided for the mode switching mechanism so that by simultaneously depressing the recording push button and the playing back push button 46 it is possible to record the sound in the same manner as in the conventional sound recording and playing back apparatus utilizing cassettes.

Figure 5:
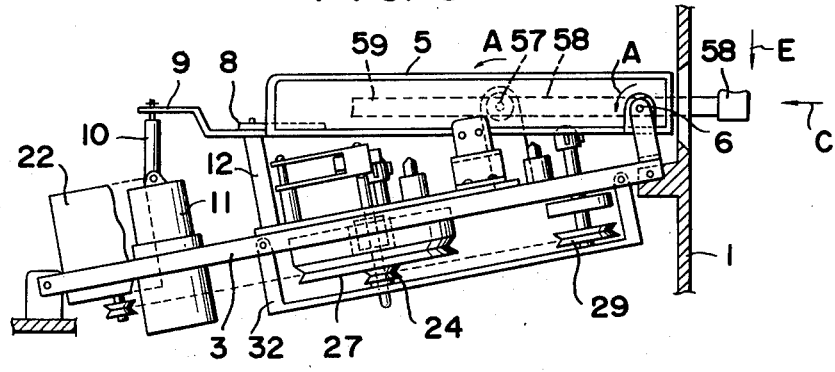
FIG. 5 is a side view showing a modified cassette loading mechanism of this invention.
Figure 6:
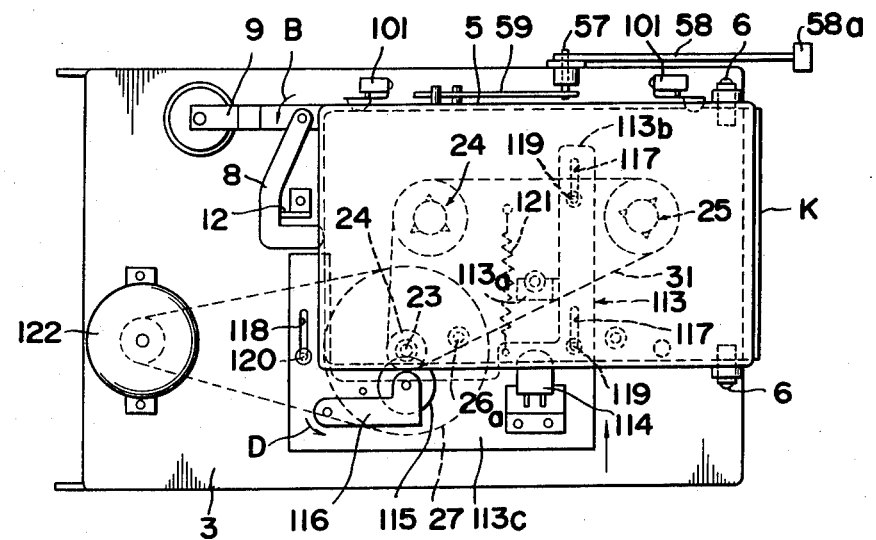
FIG. 6 is a plan view of the modified cassette loading mechanism shown in FIG. 5.

FIGS. 5 and 6 illustrate still another embodiment of this invention in which the same elements as those shown in FIGS. 1 and 2 are designated by the same reference numerals whereas elements equivalent to those shown in FIGS. 1 and 2 are designated by the same reference numerals added with 100. In this embodiment, however, for the purpose of inserting a cassette with its tape surface on one side, the cassette insertion opening of the cassette holder 5 has a width corresponding to the shorter side of the cassette and the depth of the cassette holder is made to be substantially equal to the longer side of the cassette. Although not shown, windows are formed through one side of the cassette holder. The mechanisms for detecting the insertion of the cassette into the cassette holder to rotate downwardly the cassette holder and for effecting the upward movement of the cassette holder are identical to those shown in the previous embodiments. The arrangement of the capstan 23, reel supporting platforms 24 and 25, and guide pin 26a is made to be different from that shown in the previous embodiment since the side of insertion of the cassette has been changed.

As before an operating lever 113 is mounted on the chassis 3. Thus, the long leg 113b and short leg 113d of the operating rod 113 are connected to the chassis 3 through elongated 5 slots 117 and 118 slidably receiving pins 119 and 120 secured to the chassis. The operating lever 113 is mounted on the chassis to be slidable in the direction of insertion of the cassette. A connecting member 113c interconnecting both legs 113b and 113d and extending in the direction of insertion of the cassette is used to carry a magnetic head 114 at a predetermined position, and a pinch roller 115 is mounted on the free end of a lever 116 urged against the cassette holder 5 in a direction indicated by an arrow D by a spring, not shown.

Figure 7A:
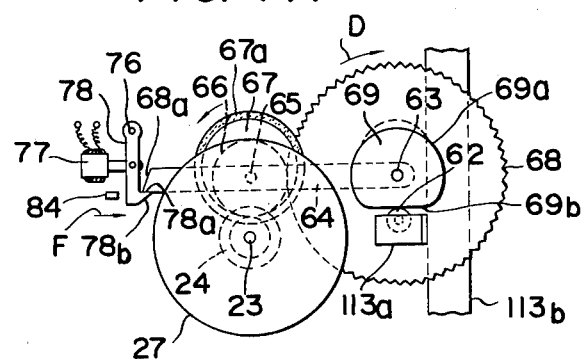
FIG. 7A is a plan view showing essential elements of the mode switching mechanism.

An operating member 113a is connected to the inner side of the long leg 113b, the operating member 113a extending through an elongated slot, not shown, through the chassis and projecting downwardly into the subchassis 32 mounted on the lower side of the chassis 3. As shown in FIG. 7A a roller 62 is rotatably mounted on the operating member 113a to rotate about a shaft perpendicular to the chassis. The roller 62 cooperates with the mode switching mechanism as will be described later with reference to FIG. 7C.

It is advantageous to use an electronic motor as the driving motor 22. The control circuit for this motor is shown in FIG. 8.

Shaft 63 shown in FIG. 7A is located at a position remote from capstan 23 in a space between chassis 3 and sub-chassis 32 for rotatably supporting a lever 64 within the subchassis 32. A shaft 65 is provided at about the center of the lever 64 for rotatably supporting a gear 66 and an eccentric disc 67 which is integral with the gear 66 and having a diameter larger than that of the gear 66 so that the gear is contained within the periphery of the eccentric disc 67. The periphery of the eccentric disc is surrounded by a rubber ring 67a. The lever 64 is urged toward the capstan by means of a biasing spring, not shown. A gear 68 made of insulating material and having teeth of the number 4 times of that of the teeth of the gear 66 meshing therewith is loosely mounted on shaft 63.

Figure 7B:
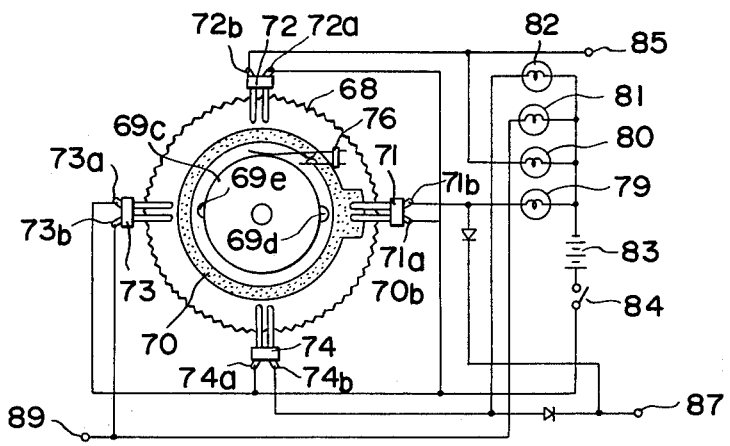
FIG. 7B shows a bottom plan view of certain elements of the mode switching mechanism shown in FIG. 7A and an alectrical circuit associated therewith.

The cam 69 concentric with the gear 68 is formed integral therewith. The cam 69 is provided with an arcuate periphery 69a extending for an angle of 270° about the center and a flat portion 69b with its opposite ends connected to the arcuate periphery 69a through arcuate surfaces of small radius. The above described roller 62 is normally urged against the peripheral surface of the cam 69 by the spring biasing force applied to the operating lever 113. As shown in FIG. 7B, the cam 69 is provided with a circular disc portion 69c projecting beneath the gear 68. The circular disc portion 69c is provided with radial projections 69d and 69e on both ends of a diameter extending in parallel with the flat portion 69b of the cam 69.

As shown in FIG. 7B, a conductor ring 70 is secured to the lower surface of the gear 65 in concentric therewith and the ring 70 is provided with a radial projection 70b on a portion of its periphery. The projection 70b is located 90° apart from the center of the flat portion 69b of cam 69.

A pair of electric contacts 71 is mounted on the upper surface of subchassis 32 at such position that the contacts are engaged by the projection 70b of the conductor ring 70 when the center of the flat portion 69b of cam 69 comes to oppose the roller 62. Furthermore, contact pairs 72, 73 and 74 are mounted on the upper surface of the subchassis 32 at positions spaced 90°, 180° and 270°, respectively, from the contact pair 71 so as to be successively engaged by the projection 70b of the conductor ring 70. A normal close switch 76 having its operating member engaged against the periphery 69c of the cam 69 is also mounted on the subchassis 32 at the same angular position as the second contact pair 72 (in FIG. 7B, the switch 76 is shown as being displaced from the contact pair 72).

The electrical connection of these contact pairs and the switch will be described later with reference to FIG. 8 which also shows a control circuit. The purpose of the switch 76 is to disconnect an electronic governor, not shown, from motor 22. The motor 22 is designed such that when it is disconnected from the electronic governor, the motor will rotate at a speed of 4 times of the speed when the governor is connected to the motor.

Referring again to FIG. 7A, a locking lever 78 operated by the plunger 77 of a solenoid coil energized in a manner to be described later is provided to lock the free end of the lever 64. The lever 78 is pivotally mounted at 76 and urged against lever 64 in the direction of arrow F by a spring, not shown.

The contacts 71a through 74a of respective contact pairs 71, 72, 73 and 74 are connected to the positive pole of a DC source 83 for lighting indicating lamps 79, 80, 81 and 82, respectively, through a normal close switch 84 which is opened only when the locking lever 78 is retracted from the free end of the lever 64. The contacts 71b through 74b of the contact pairs are connected to the opposite terminals of respective lamps 79 through 82. The contact 72b of the second contact pair 72 is connected to terminal 85 which is connected to the input terminal 86 of the control circuit shown in FIG. 8, whereas output contact 87 connected to contacts 71b and 74b of the first and fourth contact pairs 71 and 74 is connected to the other input terminal 88 of the control circuit. The output contact 89 connected to the contact 73b of the third contact pair 73 is connected to another input terminal 90 of the control circuit.

Figure 7C:
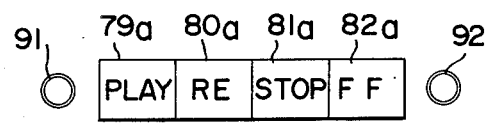
FIG. 7C is a front view of the operating buttons of the mode switching mechanism.

FIG. 7C shows an arrangement of the control switches which are mounted on the front panel 1, not shown in FIGS. 5 and 6. The first and second control switches 91 and 92 are constructed to be closed so long as they are depressed and mounted on the control panel with a spacing therebetween. The indicating lamps 79 through 82 are mounted between control switches 91 and 92. Respective lamps are covered by display covers 79a through 82a which are labelled with letters PLAY, RE, STOP and FF respectively. The control circuit for the driving motor shown in FIG. 8 includes a flip-flop circuit 95 connected to receive differentiated pulses from differentiating circuits 93 and 94 when the control switches 91 and 92 are operated. The input terminals of the differentiating circuits 93 and 94 are connected to the input terminals 88 and 86 of the control circuit. Another input terminal 90 of the control circuit is connected to one input terminal on a second flip-flop circuit 96 through a differentiating circuit 97. The signals produced by the operations of the control switches 91 and 92 are also applied to the coil for operating plunger 77 and to a differentiating circuit 98 connected to the other input terminal of the second flip-flop circuit 96.

The first flip-flop circuit 95 is constructed such that it produces an output on its output terminal 99a when it receives the output from the differentiating circuit 93 and that it produces an output on the other output terminal 99b when it receives the output of the second differentiating circuit 94. The output on the output terminal 99a is used to drive the motor in the forward direction through a relay or an electronic switch, not shown, whereas the output on the output terminal 99b is used to drive the motor in the reverse direction.

The output terminal 100 of the second flip-flop circuit 96 is connected to an electronic switch, not shown, for connecting the motor 22 to the source of supply.

The operation of the second embodiment shown in FIGS. 5, 6, 7 and 8 will now be described. Upon insertion of the cassette into the cassette holder 5, the cassette holder is rotated downwardly, whereas it is moved upwardly by the operation of the knob 58a in the same manner as has been described in connection with the first embodiment. The second embodiment is different from the first embodiment in the manner of switching the modes. More particularly, FIGS. 7A and 7B show a condition of playing back the magnetic tape. Under there conditions, the center of the flat portion 69b of cam 69 engages roller 62 of the operating member 113a and the free end of lever 64 is engaged by the locking lever 78 so that the periphery of the eccentric wheel 67 is separated from the capstan 23. Under these conditions since the operating lever 113 is pulled by spring 121 to approach to the side surface of the cassette holder 5, the pinch roller 115 enters into the cassette holder through a window in said side surface to clamp the magnetic tape between the pinch roller 115 and the capstan 23 and the magnetic head 114 is held close to the magnetic tape. Further, the projection 70b of the conductor ring 70 secured to the lower surface of gear 68 closes contact pair 71, thereby lighting lamp 79 which illuminates display cover 79a labelled with the letter PLAY. The output produced on the contact 71b at this time is impressed upon the control circuit shown in FIG. 8 via terminals 87 and 88 thus driving the motor 22 in the forward direction. As a consequence, the tape is driven in the forward direction for effecting playing back.

To switch the mode from playing back to rewinding, switch 91 is operated. Operation of this switch causes energization of the coil for operating the plunger 77 with the result that the locking lever 78 is disengaged from the free end of lever 64 against the biasing force of the spring. Then the lever 64 rotates toward capstan 23 to urge the rubber ring 67a of the eccentric wheel 67 against the capstan 23. At this time switch 91 is released whereby the coil for operating plunger 77 is deenergized. The eccentric wheel 67 is driven by the capstan 23 and rotates one revolution. During this one revolution, the lever 64 is forced by the eccentric wheel to reciprocate one cycle about the center of capstan 23. As the coil of the plunger 77 has been deenergized the locking lever 78 is freed. The hood 78a of the locking lever 78 is maintained in the path of movement of the free end of the lever 64 by the biasing spring. However, as the lower end of the hook 78a is inclined as at 78b and since the free end of the lever 64 is also inclined in the same direction as at 68a, clockwise rotation of lever 64 as viewed in FIG. 7A will not be prevented. When the eccentric wheel 67 completes one revolution the free end of the lever 64 is again locked by the hook 78a of the locking lever thus maintaining the eccentric wheel 67 away from the capstan 23, and the rotation of the eccentric wheel is stopped. Thus, the eccentric wheel makes one complete revolution. During this rotation of the eccentric wheel the gear 68 and the cam 69 integral therewith make ¼ rotation. This rotation causes roller 62 to ride on the arcuate surface 69a of cam 69 for moving the operating lever 113 away from the side surface of the cassette holder 15. Consequently, the pinch roller 115 and the magnetic head 114 are separated away from the cassette holder 5 thus freeing the magnetic tape in the cassette. The projection 70b of the conductor ring 70 secured to the lower side of gear 68 closes contact pair 72 whereby lamp 80 is lighted and an output is provided at the output terminal 85. Lighting of lamp 80 illuminates display cover 80a labelled with RE. At this time the high portion 69a of cam 69 opens the normal close switch 76 thus disconnecting the driving motor 22 from the electronic governor. The output appearing at the terminal 85 is applied to the input terminal 86 of the control circuit so that the flip-flop circuit 95 inverts its state thereby producing an output on its output terminal 99b. Consequently, the motor 22 is driven in the reverse direction at a speed of 4 times of the normal speed for rewinding the magnetic tape.

To stop the apparatus, the switch 91 is depressed again. Then the state of the fli-flop circuit 95 is inverted again thus driving the motor 22 in the forward direction. At the same time, the coil of the plunger 77 is energized again for an interval in which the switch 91 is maintained depressed, whereby the eccentric wheel 67 makes one complete revolution in the same manner as above described. Immediately after commencement of this one complete revolution the high portion 69a of cam 69 disengages from switch 76 to close the same. Then the motor 22 is reconnected to the electronic governor to run at the normal speed. Before the eccentric wheel 67 completes one revolution the cam 69 rotates 90° so that the projection 70b of the conductor ring 70 closes contact pair 73. As a result, lamp 81 is lighted to illuminate display cover 81a labelled with STOP.

The output produced by contact 73b is applied to the control circuit through terminals 89 and 90 for inverting the state of the second flip-flop circuit 96 thereby removing the output on the output terminal 100. Thus, the driving motor 22 is stopped. At this time, the roller 62 of the operating member 113a engages the high portion 69a of cam 69 so that the pinch roller 115 and the magnetic head 114 are maintained remote from the side surface of the cassette holder 5, in the same manner as in the case of rewinding.

To change the mode from this mode to the rapid feeding mode, switch 91 is to be operated again. Then, in the same manner as above described, the cam 69 is rotated 90°, thus closing the fourth contact pair 74 by the projection 70b of the conductor ring 70. Furthermore, the high portion 69a of cam 69 opens switch 76 thus disconnecting the driving motor frosm the electronic governor. Closure of the contact pair 74 lights lamp 82 thus illuminating display cover 82a labelled with FF. Under these conditions, since the magnetic tape is not clamped between the pinch roller 15 and the capstan 23, and since the motor 22 has been disconnected from the electronic governor the motor rotates in the forward direction at a speed of 4 times of the normal speed thus providing rapid feeding.

At this time when the switch 91 is operated again, cam 69 is rotated further by 90° in the same manner as above described to resume the condition shown in FIG. 7A, thus assuming the playing back mode.

As has been described above, according to this invention, it is possible not only to switch the modes sequentially through PLAY, RE, STOP and FF modes but also to directly switch the mode from playing back mode to rapid feeding mode. The latter switching can be made by continuously depressing the switch 91 for causing the eccentric wheel 67 to make two revolutions and then releasing switch 91 when the display cover 80a is illuminated by lamp 80. Thereafter, the mode can be switched to the rapid feeding mode just in the same manner as the switching of from the stop to the rapid feeding mode. In this case, however, at the end of the first complete revolution of the eccentric wheel 67, the projection 70b of the conductor ring 70 closes the contact pair 72. Then, a motor reversing signal would otherwise be produced at the terminal 85, but since the normal close switch 84 connected in series with the lighting source 83 is opened by the retraction of the locking lever 78, such signal would not be produced by the closure of the contact pair 72 thus preventing undesired reversal of the driving motor during mode switching.

To switch the mode from stop to playing back mode, the switch 92 is depressed until the eccentric wheel 67 completes one revolution. Actuation of the switch 92 inverts the state of the first flip-flop circuit 95 thus producing an output on its output terminal 99b which reverses the rotation of the driving motor 22 thus rotating the capstan 23 and the eccentric wheel 67 in the reverse direction. As a consequence, the cam 69 returns to the rewinding mode from the stop mode.

At this time, contact pair 72 is closed by the projection 70b of the conductor ring 70 thus illuminating display cover 80a labelled with RE by lamp 80 and the output produced at the output terminal 85 converts the control circuit to the reverse running condition. Then the eccentric wheel 67 and the cam 69 continue to rotate in the direction mentioned above even after the release of the switch 92 until they are stopped at the position of playing back mode, thus resuming the condition shown in FIG. 7A. It is believed unnecessary to describe again the recording mode since it is identical to that of the first embodiment. Although not shown in the drawing for the sake of simplicity, braking force is applied to the reel supporting platforms at the time of switching the mode by producing an output signal by a switch 40 closed by the retraction of the locking lever 78 and by operating a plunger for a definite interval which actuates the brake device by said output signal through an electric circuit which includes a CR time constant circuit, an one shot multivibrator circuit, etc.

In this manner, according to this modification it is possible to effect mode switching by using the driving power of the capstan. Moreover, the construction and operation of the mode switching mechanisms are simple because it is necessary to provide only two control switches 91 and 92.

Moreover, according to this modified embodiment, since the cassette is inserted into the cassette holder in the longitudinal direction thereof it is possible to readily dispose a cassette detection member to confront the longer side of the cassette holder for cooperating with notches for identifying the type of the magnetic tape and opening for preventing erroneous erasure of the record which are provided at the upper edges of the cassette. In FIG. 6, an erroneous erasure preventing mechanism is shown by a reference numeral 101.

It should be understood that the invention is not limited to the specific embodiments described above. For example, in the embodiment shown in FIG. 2B wherein the cassette is inserted into the cassette holder with the tape surface directed to the interior of the cassette holder it is also possible to switch the mode by using the power for driving the capstan in the same manner as in the embodiment shown in FIGS. 5 and 6. It is also to be understood that the mode switching mechanism utilizing the driving power of the capstan can take various forms.

Further, in the foregoing embodiments the invention has been described as applied to a household stereo set it will be clear that the invention is also applicable to cassette desks.

In the second embodiment, if the mode switching is to be performed cyclically, the second switch 92 may be omitted thereby simplifying the construction.

It is also to be understood that the means for deriving out the power for driving the cam and the capstan and the arrangement of the contacts for controlling the driving motor are not limited to specific constructions illustrated in the embodiments.

What is claimed is:

1. A cassette loading device for use in magnetic sound recording and playing back apparatus comprising a chassis mounted on the inner side of the front panel of the holder of the apparatus, said chassis inclining downwardly; a capstan for driving a magnetic tape and reel supporting platforms mounted on said chassis; a cassette holder having a bottom plate and being mounted on said chassis to be rotatable about an axis perpendicular to the direction of insertion of a cassette containing said magnetic tape into said cassette holder, said cassette holder being provided with a cassette insertion opening confronting the cassette insertion opening provided for said front panel; spring means for biasing said cassette holder to rotate downwardly; a cassette detection lever mounted near the inner end of said cassette holder so as to be rotated a predetermined angle by said cassette when it is inserted completely; a stop member mounted on said chassis, the upper surface of said stop member cooperating with said cassette detection lever before completion of the insertion of said cassette thereby maintaining said cassette holder in the horizontal position against the biasing force of said spring means; and an operating lever mounted on the bottom plate of said cassette holder to be slidable in the direction of insertion of said cassette, said operating lever including a portion extending in parallel with the inner edge of said cassette holder, a magnetic head and a pinch roller mounted on said portion, and spring means for biasing said operating lever to pull said portion toward said cassette holder.

2. The cassette loading device according to claim 1 wherein said operating lever further includes an operating member depending downwardly along the inner surface of said front panel, and said cassette loading device further comprises a mode switching mechanism including a plurality of push buttons mounted on said front panel for cooperating with said operating member thereby moving said portion toward and away from the inner edge of said cassette holder and driving the driving motor of the sound recording and playing back apparatus in the forward and reverse directions.

3. The cassette loading apparatus according to claim 2 wherein said mode switching mechanism comprises a rectangular frame, a plurality of push buttons slidably mounted on said frame for engaging said operating lever to switch the operation mode of the magnetic recording and playing back apparatus equipped with the cassette loading apparatus, a locking bar mounted on said rectangular frame to be slidable in a direction perpendicular to respective push buttons, shoulders provided for respective push buttons and plurality of pins mounted on said locking bar for engaging the shoulders of respective push buttons, and spring means for biasing said locking bar in a predetermined direction whereby when one of the push buttons is depressed it is maintained in the depressed position by the engagement of one pin and the shoulder of the depressed push button whereas other push buttons are unlocked and reset.

4. The cassette loading device according to claim 3 which further comprises a brake device for applying a braking force to the reels of the cassette and means responsive to the movement of said locking bar for actuating said brake device.

5. The cassette loading device according to claim 1 which further comprises a mode switching mechanism including a stationary shaft, a lever, a first gear and a cam integral therewith which are rotatably mounted on said shaft, said cam having an arcuate portion and a flat portion and cooperating with an operating lever carrying a magnetic head and a pinch roller, a second gear meshing said first gear and an eccentric wheel which are mounted on said lever, means for biasing said lever for urging said eccentric wheel against said capstan, an electrically operated locking lever for normally locking said lever at a position in which said eccentric wheel is disengaged from a capstan whereby when said locking lever is disengaged from said lever, said eccentric disc is urged against said capstan so as to actuate said operating lever by said cam.

6. The cassette loading device according to claim 5 which further comprises a plurality of display lamps for displaying the mode of operation of the magnetic recording and playing back apparatus, a plurality of switches for controlling said switches and means carried by said first gear for sequentially operating said switches.

* * * * *